(12) United States Patent
Cha et al.

(10) Patent No.: US 10,773,699 B2
(45) Date of Patent: Sep. 15, 2020

(54) CYLINDER APPARATUS FOR BRAKE

(71) Applicant: Hyundai Mobis Co., Ltd., Seoul (KR)

(72) Inventors: Myeon Gyu Cha, Yongin-si (KR); Seong Hun Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 16/241,405

(22) Filed: Jan. 7, 2019

(65) Prior Publication Data
US 2019/0210577 A1 Jul. 11, 2019

(30) Foreign Application Priority Data

Jan. 8, 2018 (KR) .................. 10-2018-0002251
Apr. 23, 2018 (KR) .................. 10-2018-0046672

(51) Int. Cl.
| | |
|---|---|
| *B60T 11/16* | (2006.01) |
| *B60T 11/236* | (2006.01) |
| *F16J 1/00* | (2006.01) |
| *F16J 15/16* | (2006.01) |
| *F16J 10/02* | (2006.01) |
| *B60T 11/20* | (2006.01) |

(52) U.S. Cl.
CPC ............ *B60T 11/165* (2013.01); *B60T 11/20* (2013.01); *B60T 11/236* (2013.01); *F16J 1/005* (2013.01); *F16J 10/02* (2013.01); *F16J 15/16* (2013.01)

(58) Field of Classification Search
CPC ...... B60T 11/165; B60T 11/20; B60T 11/236; B60T 11/24; F16J 1/005; F16J 15/16; F16J 10/02
See application file for complete search history.

(56) References Cited

U.S. PATENT DOCUMENTS

| | | | | |
|---|---|---|---|---|
| 5,617,725 | A * | 4/1997 | Yasuda ................... | B60T 11/16 60/562 |
| 6,832,479 | B2 * | 12/2004 | Nakagawa .......... | B29C 45/0025 60/589 |
| 7,997,075 | B2 * | 8/2011 | Drott ..................... | B60T 11/232 60/585 |
| 9,651,634 | B2 * | 5/2017 | Kang ...................... | B60T 11/20 |
| 9,969,373 | B2 * | 5/2018 | Konig ................... | B60T 11/232 |
| 2007/0006584 | A1 * | 1/2007 | Goto ...................... | B60T 11/20 60/562 |
| 2014/0150645 | A1 * | 6/2014 | Lhuillier ............... | B60T 11/232 92/248 |

FOREIGN PATENT DOCUMENTS

KR   10-2012-0003299    1/2012

* cited by examiner

*Primary Examiner* — Thomas E Lazo
(74) *Attorney, Agent, or Firm* — H.C. Park & Associates, PLC

(57) ABSTRACT

A cylinder apparatus for a brake may include: a piston configured to reciprocate in a cylinder body; a rod coaxially coupled to the piston; a stopper disposed in the cylinder body with the rod penetrated and inserted into the stopper; and an elastic member disposed between the piston and the stopper and configured to elastically support the piston in a direction away from the stopper. The piston and the rod may be integrally formed by injection molding.

10 Claims, 10 Drawing Sheets

CYLINDER APPARATUS FOR BRAKE

CROSS-REFERENCE TO RELATED APPLICATION

The present application claims priority to Korean application numbers 10-2018-0002251 and 10-2018-0046672, filed on Jan. 8, 2018 and Apr. 23, 2018, respectively, which are incorporated by reference in its entirety.

BACKGROUND

The present invention relates to a cylinder apparatus for brakes, and more particularly, to a cylinder apparatus for brakes capable of simplifying an assembly process thereof, and preventing a noise generating phenomenon.

In general, a brake for a vehicle is provided to reduce the speed of the vehicle or maintain the vehicle in a stably stopped state. While driving the vehicle, a driver frequently manipulates the brake to adjust the speed of the vehicle or maintain the vehicle in a temporarily stopped state. When the vehicle is parked or stopped for a long time, the brake makes it possible for the vehicle to remain stably parked.

The brake may include a brake pedal configured to receive a brake manipulating force from the driver, a booster configured to amplify the force of manipulating the brake pedal using a negative pressure provided from an intake system of an engine, a master cylinder configured to generate a high brake pressure by the operation of the booster, and a wheel cylinder or a cylinder of a caliper which is configured to perform a braking operation by holding a brake drum of a wheel using hydraulic pressure provided from the master cylinder.

When the driver manipulates the brake pedal while driving the vehicle, the booster amplifies the brake pedal manipulating force, and the master cylinder generates hydraulic pressure using the amplified force. The generated hydraulic pressure is applied to the wheel cylinder or the cylinder of the caliper. Thereby, braking force is applied to the wheel by a piston operation of the wheel cylinder or the cylinder of the caliper.

With regard to detailed configuration of the conventional master cylinder, a rod is coupled to a piston in a bolt coupling manner. Here, a separate component such as a washer unit is needed to reinforce the coupling force between the rod and the piston and reduce the friction therebetween. Hence, there is a problem in that the number of parts and the production cost are increased.

On the one hand, a spring assembly formed of a piston, a rod, a spring, a stopper, etc. is installed in the master cylinder to prevent a hydraulic pressure deviation and determine an advancing distance of the piston required to generate a hydraulic pressure.

Here, a problem arises in that, when the spring is compressed by advancing the piston of the spring assembly, the rod functioning as a guide may wobble and thus buckle, and scratches and noises may be continuously generated by contact between the spring and the inner circumferential surface of the piston.

Furthermore, the conventional art is problematic in that the number of parts constituting the spring assembly is relatively large, and an assembly process is complex, whereby the production cost is increased.

The related art of the present invention is disclosed in Korean Patent Unexamined Publication No. 10-2012-0003299 (published on Jan. 10, 2012 and entitled "Plunger master cylinder for brake").

SUMMARY

Embodiments of the present invention are directed to a cylinder apparatus for brakes in which a piston and a rod are integrally formed by injection molding so that an assembly process may be simplified, and a noise generating phenomenon may be prevented.

Embodiments of the present invention are directed to a cylinder apparatus for brakes in which a noise generating phenomenon may be prevented by changing the materials and shapes of parts, and which has an improved structure such that the number of various parts is reduced, whereby the weight of the cylinder apparatus may be reduced, and the production cost may be reduced.

In one embodiment, a cylinder apparatus for a brake may include: a piston configured to reciprocate in a cylinder body; a rod coaxially coupled to the piston; a stopper disposed in the cylinder body, with the rod penetrated and inserted into the stopper; and an elastic member disposed between the piston and the stopper and configured to elastically support the piston in a direction away from the stopper. The piston and the rod may be integrally formed by injection molding.

The rod may include: a rod body coupled at one end thereof to the piston; and a rod head coupled to the other end of the rod body and configured to pass through a through hole formed in the stopper.

The rod head may have a round shape on a stopper-side end thereof.

An outer diameter of the rod head may be greater than an inner diameter of the through hole.

The piston may be formed of resin.

The stopper may be formed of resin.

In another embodiment, a cylinder apparatus for a brake may include: a floating piston configured to reciprocate in a cylinder body; a primary piston configured to reciprocate in the cylinder body in conjunction with the floating piston; a first rod coaxially provided with the primary piston and coupled to one side of the primary piston, the first rod being disposed to protrude toward the floating piston; a compressing block coaxially provided with the primary piston and coupled to the other side of the primary piston so that the compressing block is compressed by a push rod of a booster; a first stopper coupled to the floating piston, with the first rod penetrated and inserted into the first stopper; and an elastic member disposed between the primary piston and the first stopper and configured to elastically support the primary piston in a direction away from the first stopper. The primary piston may be formed of resin, and the first rod and the compressing block may be formed of metal.

The first rod and the compressing block may be integrally formed.

The primary piston may be integrally formed with the first rod and the compressing block through an insert injection molding process.

A retainer having a size corresponding to an inner diameter of the first stopper may be installed on an end of the first rod.

The retainer may be provided with an elastic coupling piece bent in a direction in which the first rod is coupled to the retainer, and the first rod may have in the end thereof a locking groove to which the elastic coupling piece is locked.

In accordance with the present invention, a piston and a rod are integrally formed by injection molding, so that a separate assembly process for the piston and the rod is not required, whereby an overall assembly process may be simplified.

Furthermore, the piston and a stopper are formed of resin. Thus, the weight of a product may be reduced compared to the case where the piston and the stopper are formed of metal.

In addition, since the piston and the stopper are formed of resin, noise may be prevented from being generated when the piston moves and collides with the stopper, compared to the case where the piston and the stopper are formed of metal.

Also, since the piston and the stopper are formed of resin, the piston and the stopper may be prevented from being damaged by friction therebetween.

Furthermore, in the present invention, noise generation may be prevented by changing the materials and shapes of parts.

In addition, the number of various parts may be reduced by improvement in structure, whereby the weight of a product may be reduced, and the production cost may be reduced.

DETAILED DESCRIPTION

Hereinafter, an embodiment of a cylinder apparatus for brakes in accordance with the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
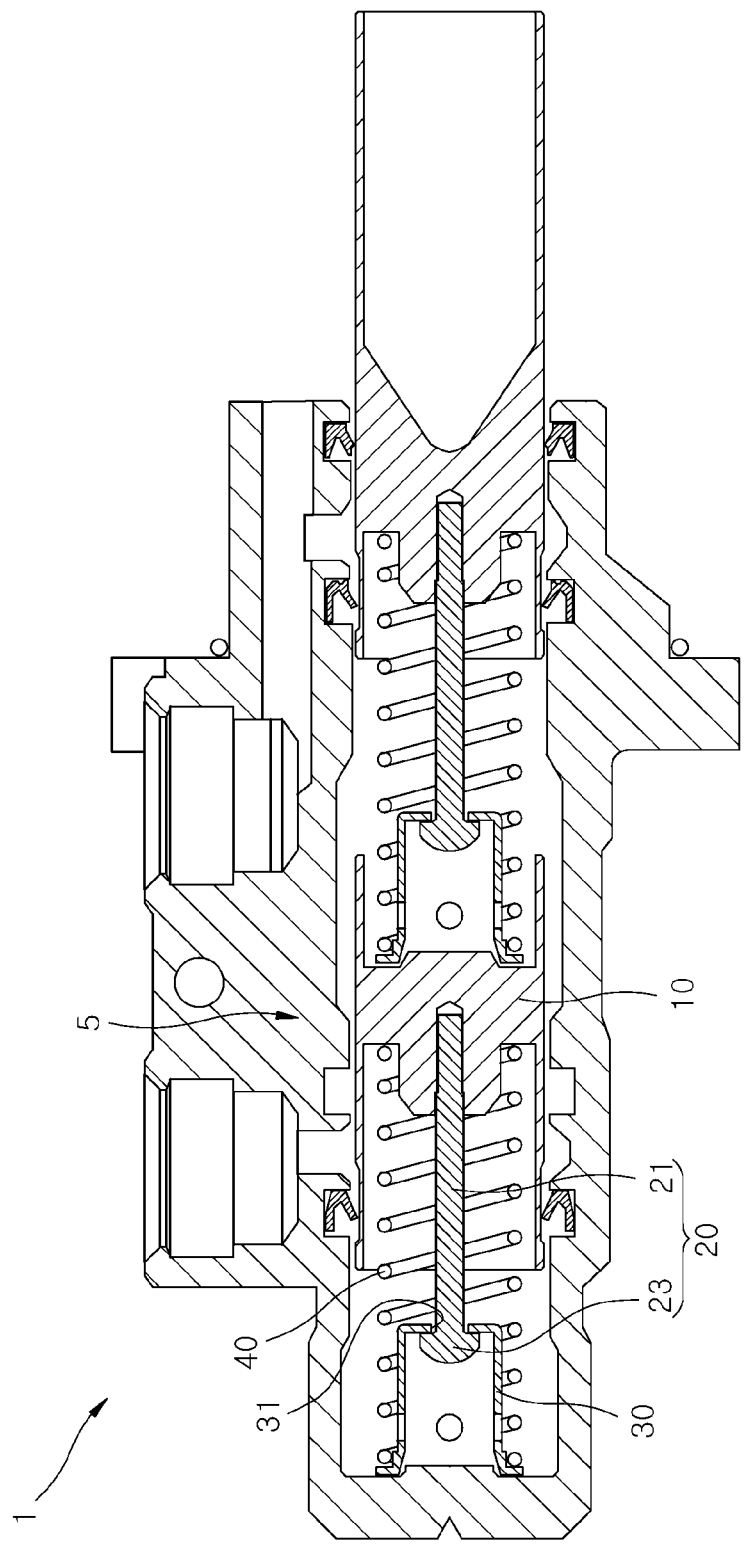
FIG. 1 is a side sectional view illustrating a cylinder apparatus for brakes in accordance with an embodiment of the present invention.
Figure 2:
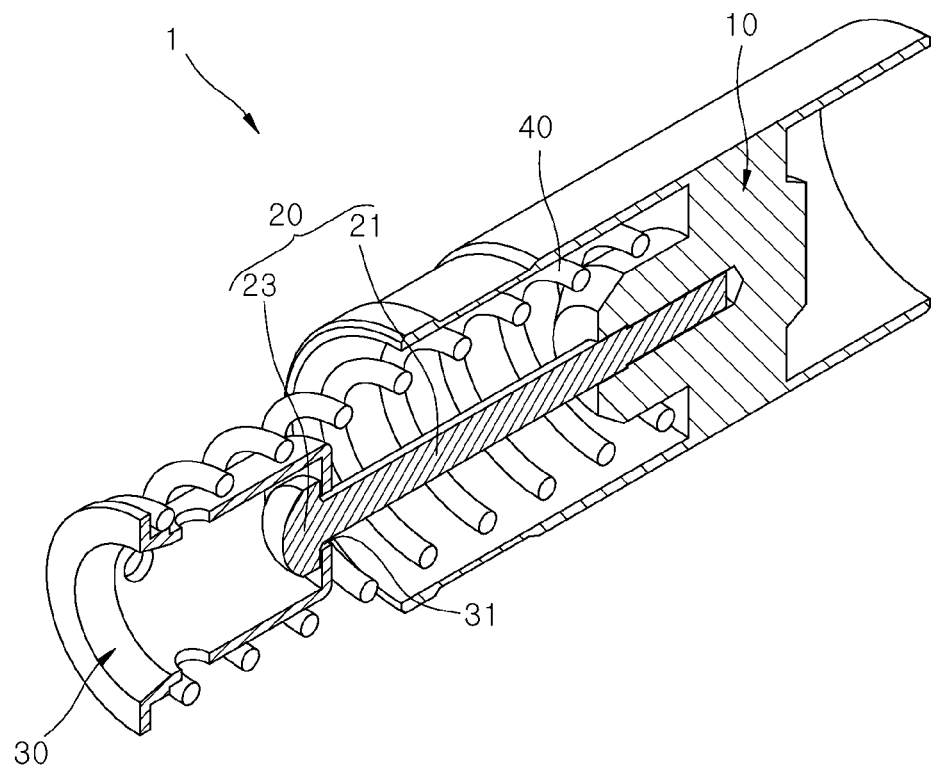
FIG. 2 is a sectional perspective view illustrating the cylinder apparatus in accordance with the embodiment of the present invention.
Figure 3:
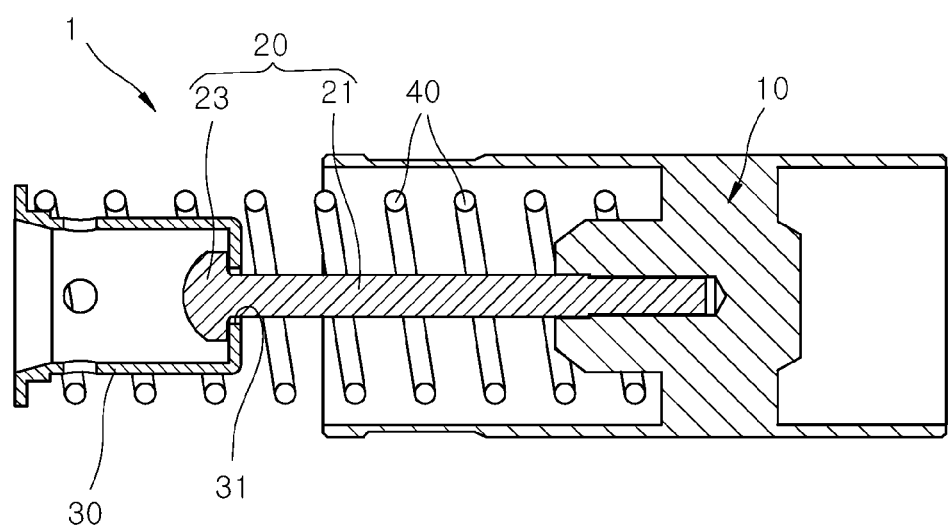
FIG. 3 is a side sectional view illustrating the cylinder apparatus in accordance with the embodiment of the present invention.
Figure 4:
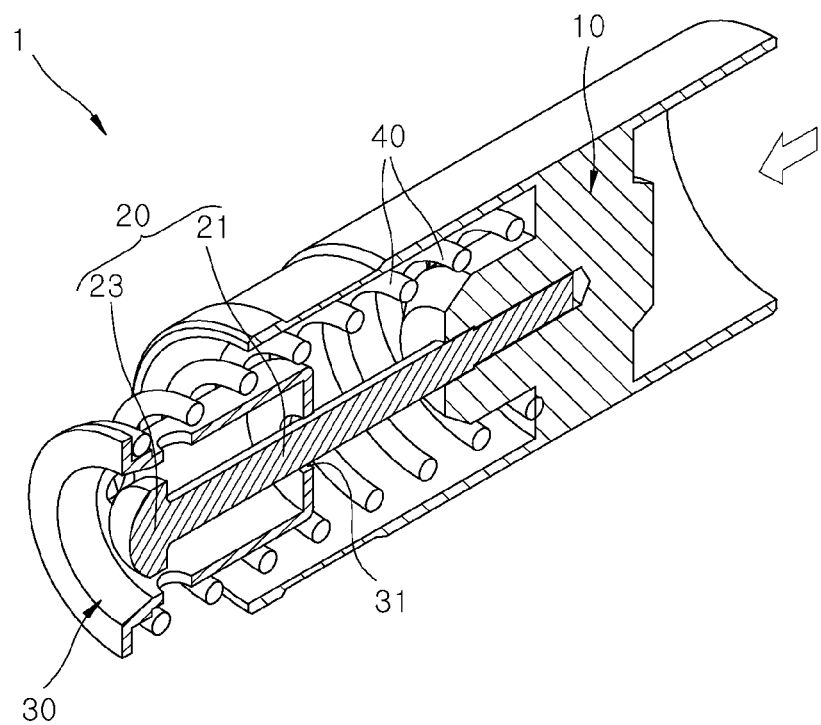
FIG. 4 is a sectional perspective view illustrating a compressed state of a piston in accordance with the embodiment of the present invention.
Figure 5:
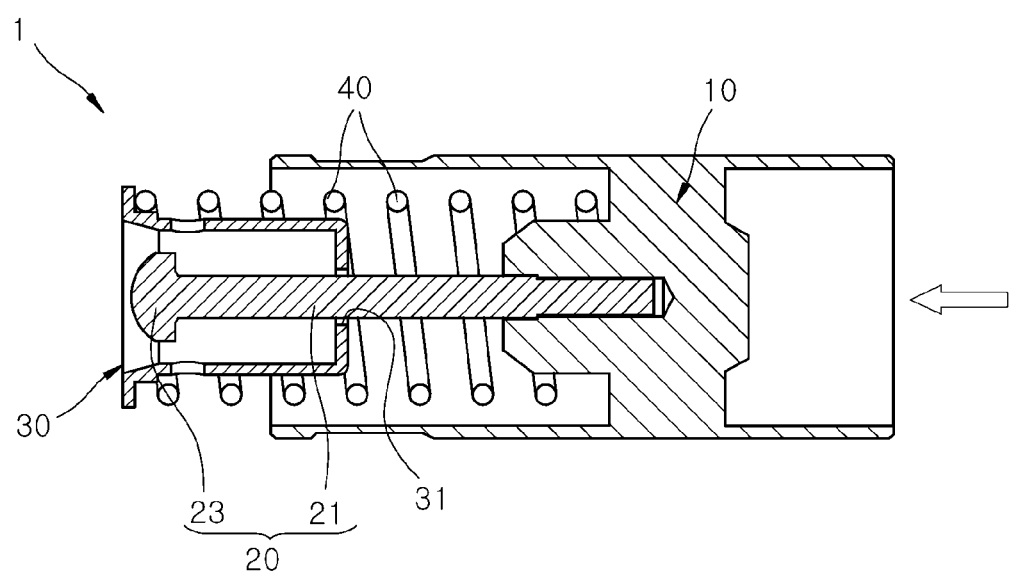
FIG. 5 is a diagram illustrating the compressed state of the piston in accordance with the embodiment of the present invention.

FIG. 1 is a sectional perspective view illustrating a cylinder apparatus for brakes in accordance with an embodiment of the present invention. FIG. 2 is a perspective view illustrating the cylinder apparatus in accordance with the embodiment of the present invention. FIG. 3 is a side sectional view illustrating the cylinder apparatus in accordance with the embodiment of the present invention. FIG. 4 is a sectional perspective view illustrating a compressed state of a piston in accordance with the embodiment of the present invention. FIG. 5 is a diagram illustrating the compressed state of the piston in accordance with the embodiment of the present invention.

Referring to FIGS. 1 to 5, the cylinder apparatus 1 for brakes in accordance with the embodiment of the present invention includes a piston 10, a rod 20, a stopper 30, and an elastic member 40.

Referring to FIG. 1, the piston 10 is disposed in a cylinder body 5 and configured to reciprocate in a left-right direction (based on FIG. 1) in the cylinder body 5.

In detail, when a driver presses a pedal unit (not illustrated) to reduce the speed of a vehicle while driving the vehicle, the piston 10 is interlocked with the operation of the pedal unit and thus moved to generate a hydraulic pressure. Here, the piston 10 compresses the elastic member 40.

Referring to FIG. 1, the piston 10 may be formed of resin. The resin is an amorphous solid or semisolid made of an organic compound and derivatives thereof. In the present invention, the resin may mean plastic.

Since the piston 10 is formed of resin, the weight of the piston 10 may be reduced compared to the case where it is formed of metal, and noise may be prevented from being generated by friction with the stopper 30 to be described below.

The piston 10 in accordance to this embodiment of the present invention is formed with the rod 20 to be described below, in detail, with a rod body 21, by injection molding. Hence, there is no need for a separate part such as a washer unit to be installed between the piston 10 and the rod 20, in detail, the rod body 21, to reduce friction between the piston 10 and the rod 20.

Therefore, compared to the conventional art in which the washer unit is installed when the rod 20 is coupled to the piston 10 by bolting or screwing, the number of parts may be reduced, and the overall structure may be simplified so that the productivity can be enhanced.

Referring to FIGS. 1 to 3, the rod 20 in accordance with this embodiment of the present invention is coaxially coupled to the piston 10.

In more detail, the rod 20 is integrally formed with the piston 10 by injection molding. Hence, a separate assembly process, e.g., a process of coupling the rod 20 to the piston 10 by screwing, is not required, whereby an overall assembly process may be simplified.

The rod 20 in accordance with this embodiment of the present invention is formed of metal such as steel. The rod 20 is penetrated and coupled to the stopper 30, and makes it possible for the piston 10 to reciprocate coaxially with the stopper 30 when the piston 10 moves in the cylinder body 5.

The rod 20 may also function to guide a movement path of the path 10.

Referring to FIGS. 1 to 3, the rod 20 in accordance with this embodiment of the present invention may include the rod body 21 and a rod head 23.

The rod body 21 in accordance with this embodiment of the present invention is coupled at one end thereof to the piston 10. The rod body 21 is inserted into an installation part (not designated by a reference numeral) formed in the piston 10, and is integrally formed with the piston 10 by injection molding.

The rod head 23 in accordance with this embodiment of the present invention is coupled to the rod body 21, more particularly, to the other end (a left end based on FIG. 3) of the rod body 21.

The rod head 23 passes through a through hole 31 formed in the stopper 30 and is thus coupled to the stopper 30. An outer diameter of the rod head 23 is greater than an inner diameter of the through hole 31.

Referring to FIG. 3, after the rod head 23 in accordance with this embodiment of the present invention is assembled with the stopper 30 by passing the rod head 23 through the through hole 31 formed in the stopper 30, the rod 20, in detail, the rod head 23, may be prevented from being undesirably removed from the stopper 30 because the rod head 23 is formed such that outer diameter of the rod head 23 is greater than the inner diameter of the through hole 31.

Since the stopper 30 in accordance with this embodiment of the present invention is formed of resin such as plastic, the rod 20, in detail, the rod head 23, may be penetrated and inserted into the stopper 30 which may be elastically deformed.

In accordance with this embodiment of the present invention, a stopper-side end (a left end based on FIG. 3) of the rod head 23 has a round shape. In other words, the stopper-side end of the rod head 23 may have a hemispherical shape.

Therefore, the round-shaped stopper-side end of the rod head 23 may be easily inserted into the through hole 31 formed in the stopper 30. The other end (a right end based on FIG. 3) of the rod head 23 that faces away from the round-shaped stopper-side end of the rod head 23 has a planar shape so that the rod 20 may be prevented from being undesirably removed from the stopper 30 after the rod 20 has been inserted into the stopper 30.

Referring to FIGS. 1 to 3, the stopper 30 in accordance with this embodiment of the present invention allows the rod 20 to be penetrated and inserted thereinto, and is disposed in the cylinder body 5.

The stopper 30 in accordance with this embodiment of the present invention has a hollow structure to allow the rod 20 to move in the stopper 30, and is brought into contact with an inner surface of the cylinder body 5 and thus fixed in position.

The stopper 30 in accordance with this embodiment of the present invention is formed of resin. Therefore, compared to the case where the piston 10 and the stopper 30 are formed of steel, noise may be prevented from being generated by friction when the stopper 30 is brought into contact with the piston 10 that reciprocates in the cylinder body 5 to generate a hydraulic pressure.

Moreover, compared to the case where the piston 10 and the stopper 30 are formed of steel, noise may be prevented from being generated when the piston 10 collides with the stopper 30.

Referring to FIGS. 1 to 3, the elastic member 40 in accordance with an embodiment of the present invention is disposed between the piston 10 and the stopper 30, and functions to elastically support the piston 10 in a direction (from the left to the right based on FIG. 3) away from the stopper 30.

The elastic member 40 in accordance with this embodiment of the present invention is formed of a coiled spring.

Thus, when the piston 10 is moved in the cylinder body 5 by manipulation of the driver, the piston 10 compresses the elastic member 40 and generates a hydraulic pressure. Due to the generated hydraulic pressure, power is transmitted to a disk unit (not illustrated), thus providing braking force.

Hereinbelow, the operating principle and effect of the cylinder apparatus 1 for brakes having the above-mentioned configuration will be described.

Referring to FIGS. 1 to 5, the cylinder apparatus 1 for brakes in accordance with the embodiment of the present invention includes the piston 10, the rod 20, the stopper 30, and the elastic member 40.

When the driver manipulates the pedal unit (not illustrated) while driving the vehicle, the piston 10 is compressed, so that the piston 10 is moved in the cylinder body 5.

In detail, the piston 10 is moved from the right to the left (based on FIG. 5) in the cylinder body 5, whereby a hydraulic pressure is generated.

The rod 20 is coaxially coupled to the piston 10. Since the rod 20 and the piston 10 are integrally formed by injection molding, a separate assembly process is not required, whereby the overall assembly process may be simplified.

Furthermore, since the rod 20 and the piston 10 are formed by injection molding, a separate part such as a washer unit is not required to be installed between the rod 20 and the piston 10. Thus, the number of parts may be reduced.

The rod 20 includes the rod body 21 and the rod head 23. Since the stopper-side end of the rod head 23 has a round shape, resistance generated when the rod head 23 passes through the through hole 31 formed in the stopper 30 may be reduced.

Therefore, the rod 20 may be coupled to the stopper 30 in a one-touch manner, whereby the overall assembly process may be simplified.

In accordance with this embodiment of the present invention, since the outer diameter of the rod head 23 is greater than the inner diameter of the through hole 31, the rod 20 may be prevented from being undesirably removed from the stopper 30 after the rod 20 has been inserted into the stopper 30.

The stopper 30 and the piston 10 in accordance with this embodiment of the present invention are formed of resin. Thus, compared to the case where the stopper 30 and the piston 10 are formed of metal such as steel or aluminum, noise may be prevented from being generated during collision due to movement of the piston 10.

In addition, the cylinder apparatus 1 for brakes may be prevented from being damaged due to collision between the piston 10 and the stopper 30.

While the present invention has been described with respect to the specific embodiment illustrated in the attached drawings, this is only for illustrative purposes, and it will be apparent to those skilled in the art that various changes and modifications may be made without departing from the spirit and scope of the invention as defined in the following claims. Therefore, the spirit and scope of the present invention should be defined by the accompanying claims.

Figure 6:
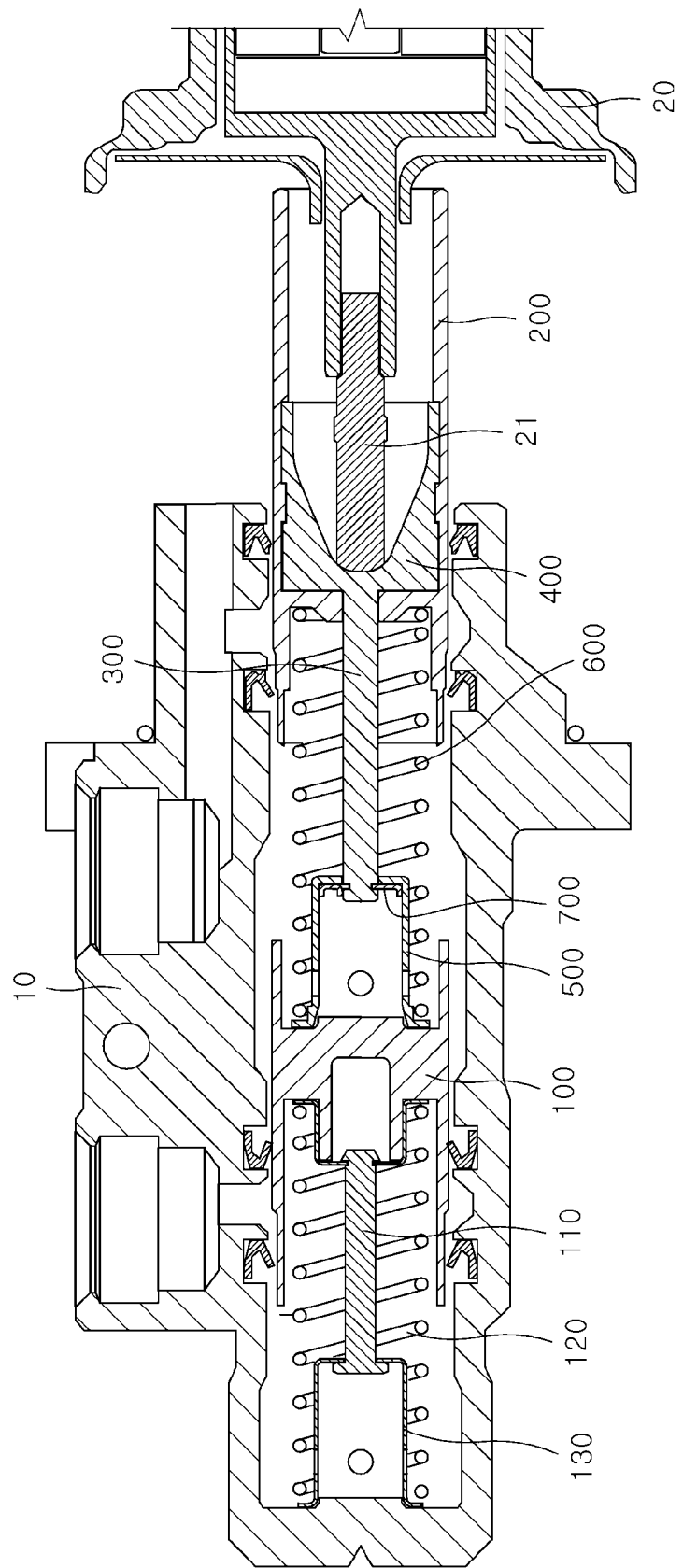
FIG. 6 is a side sectional perspective view illustrating a cylinder apparatus for brakes in accordance with another embodiment of the present invention.
Figure 7:
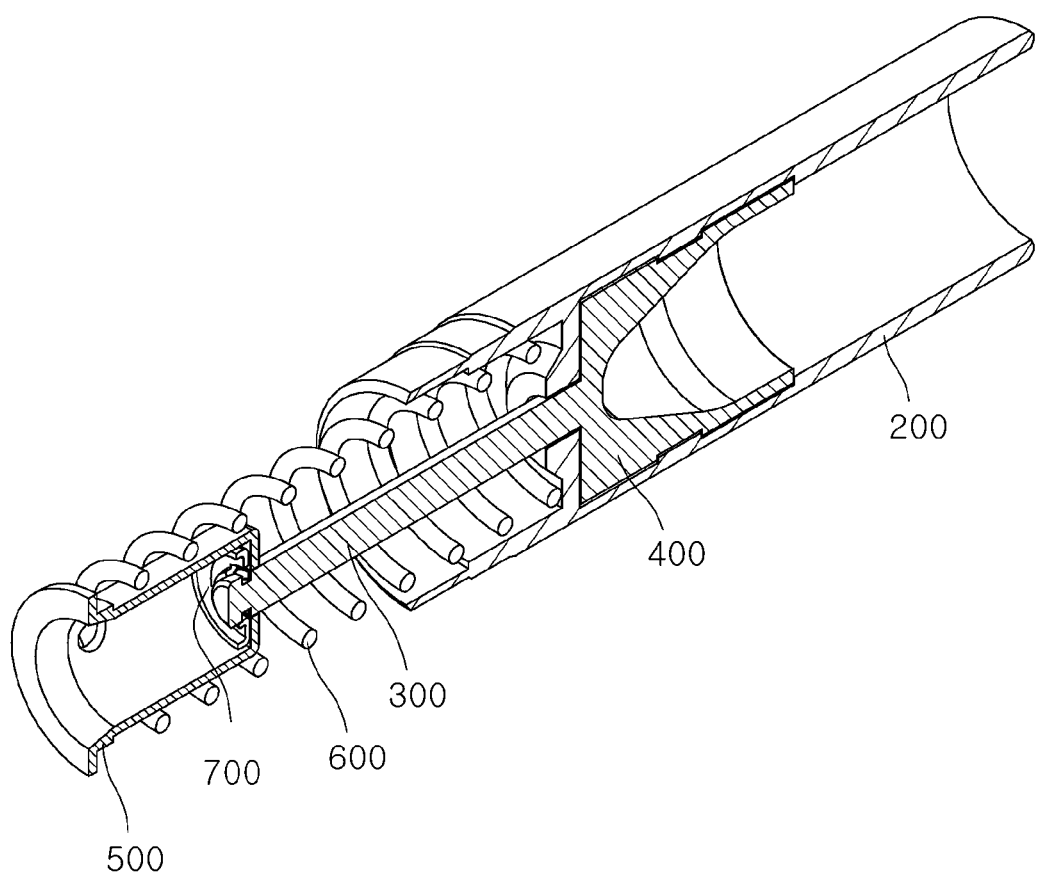
FIG. 7 is a sectional perspective view illustrating the cylinder apparatus in accordance with this embodiment of the present invention.
Figure 8:
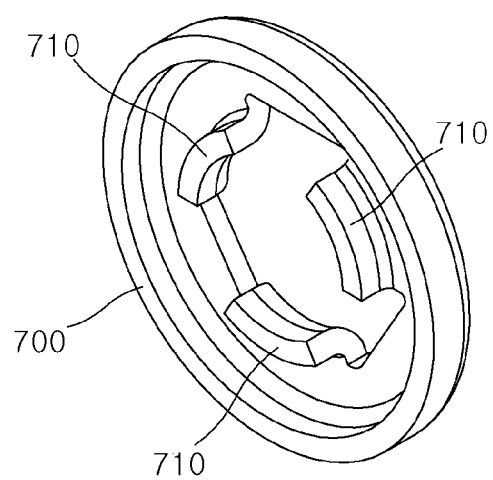
FIG. 8 is a diagram illustrating a retainer applied to the cylinder apparatus in accordance with this embodiment of the present invention.
Figure 9:
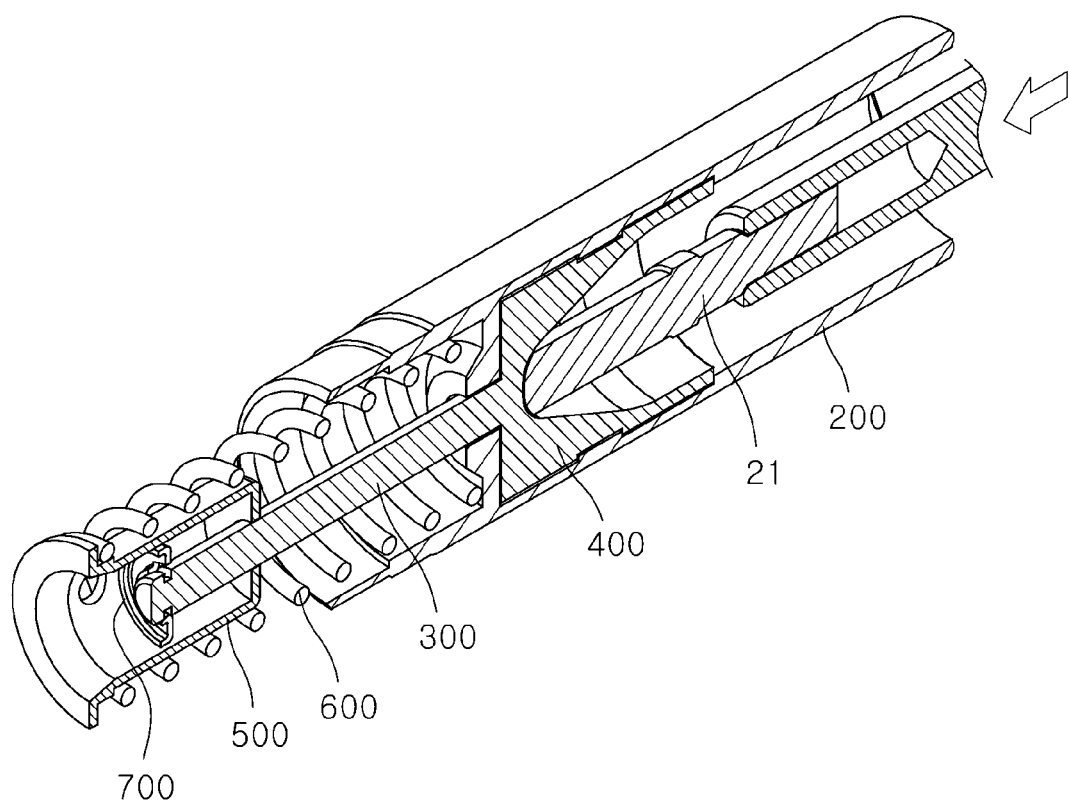
FIG. 9 is a sectional perspective view illustrating a compressed state of a primary piston of the cylinder apparatus in accordance with this embodiment of the present invention.
Figure 10:
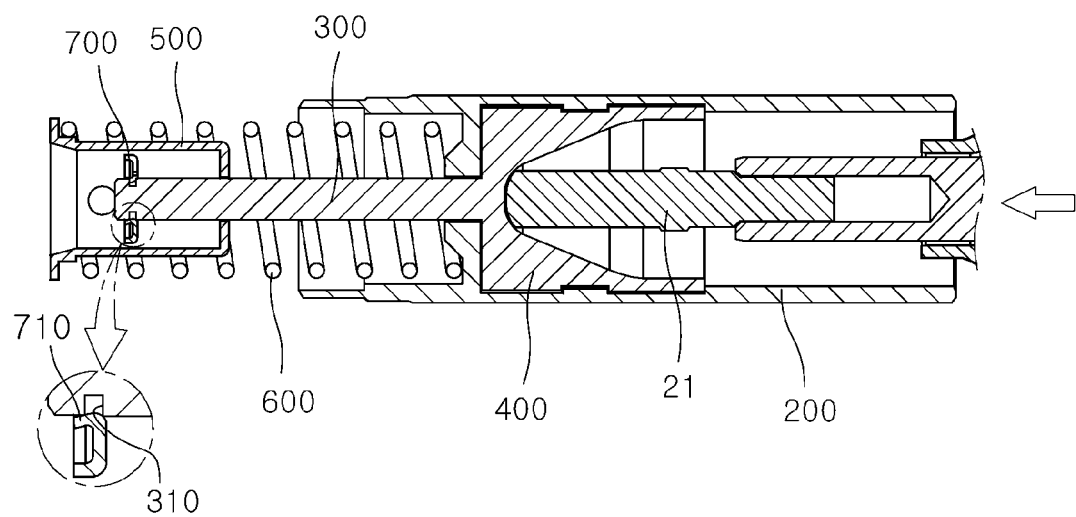
FIG. 10 is a diagram illustrating the compressed state of the primary piston of the cylinder apparatus in accordance with this embodiment of the present invention.

FIG. 6 is a side sectional perspective view illustrating a cylinder apparatus for brakes in accordance with another embodiment of the present invention. FIG. 7 is a sectional perspective view illustrating the cylinder apparatus in accordance with this embodiment of the present invention. FIG. 8 is a diagram illustrating a retainer applied to the cylinder apparatus in accordance with this embodiment of the present invention. FIG. 9 is a sectional perspective view illustrating a compressed state of a primary piston of the cylinder apparatus in accordance with this embodiment of the present invention. FIG. 10 is a diagram illustrating the compressed state of the primary piston of the cylinder apparatus in accordance with this embodiment of the present invention.

Referring to FIGS. 6 and 10, the cylinder apparatus for brakes in accordance with this embodiment of the present invention includes a floating piston 100, a primary piston 200, a first rod 300, a compressing block 400, a first stopper 500, and an elastic member 600.

Referring to FIG. 6, the floating piston 100 is disposed in the cylinder body 10. A second rod 110 and an elastic member 120 are coupled to the floating piston 100. The second rod 110 is penetrated and coupled to the second stopper 130 installed in the cylinder body 10.

The floating piston 100 reciprocates in a left-right direction (based on FIG. 6) in the cylinder body 10. In detail, when the driver presses the pedal unit (not illustrated) to reduce the speed of the vehicle while driving the vehicle, the floating piston 100 moves in conjunction with the primary piston 200 to be described below, thus generating a hydraulic pressure. Here, the floating piston 100 compresses the elastic member 120.

The primary piston 200 reciprocates in the cylinder body 10 in conjunction with the floating piston 100.

When the driver manipulates the brake pedal, the primary piston 200 is compressed by a booster 20 for amplifying the pedal manipulating force, and reciprocates while generating a hydraulic pressure. The booster 20 is provided with a push rod 21 configured to transmit compressing force.

The first rod 300 has an approximately cylindrical shape and is provided to guide the reciprocating movement of the primary piston 200. The first rod 300 is coaxially provided with the primary piston 200, and coupled to one side of the primary piston 200, and disposed to protrude toward the floating piston 100.

It is preferable that the primary piston 200 be formed of resin to restrict generation of noise due to friction with the elastic member 600 and reduce the weight of the primary piston 200. The resin is an amorphous solid or semisolid made of an organic compound and derivatives thereof. For example, the resin may be reinforced plastic having thermal resistance and abrasion resistance.

However, in the case where the primary piston 200 is formed of resin, a problem may arise in that the strength of the primary piston 200 is reduced, taking into account that fact that the primary piston 200 repeatedly receives the compressing force from the booster 20. To overcome the foregoing problem, it is preferable that a separate structure made of metal be installed on a part to which the compressing force of the push rod 21 of the booster 20 is directly applied.

To this end, a compressing block 400 is provided. The compressing block 400 is formed of metal such as aluminum, and coaxially provided with the primary piston 200, and coupled to the other side of the primary piston 200 to receive the compressing force of the push rod 21 of the booster 20.

It is preferable that the compressing block 400 be integrally formed with the first rod 300. To this end, it is preferable that the first rod 300 be also formed of metal such as aluminum.

As such, in the case where the compressing block 400 and the first rod 300 are integrated with each other, a manufacturing process may be simplified, whereby the production cost may be reduced.

Furthermore, it is preferable that the primary piston 200 be made of resin and be integrally formed with the first rod 300 and the compressing block 400 through an insert injection molding process.

As such, in the case where the primary piston 200, the first rod 300, and the compressing block 400 are integrated with each other and the primary piston 200 is made of resin, the number of parts and the weights of the parts are reduced, and the manufacturing process is simplified, whereby the weight of a product may be reduced, and the production cost may be reduced.

The first stopper 500 has a through hole 510 into which the first rod 300 is inserted. The first stopper 500 is coupled to the floating piston 100 and configured to limit a movement distance of the first rod 300.

The elastic member 600 is disposed between the primary piston 200 and the first stopper 500, and functions to elastically support the primary piston 200 in a direction away from the first stopper 500.

When the compressing force generated by the push rod 21 of the booster 20 is removed, the primary piston 200 is moved in a direction away from the floating piston 100 by the elastic force of the elastic member 600.

The retainer 700 having a size corresponding to an inner diameter of the first stopper 500 is installed on an end of the first rod 300. A plurality of elastic coupling pieces 710 are provided on the retainer 700 and bent in a direction in which the first rod 300 is coupled to the retainer 700. A locking groove 310 is circumferentially formed in the end of the first rod 300 so that the elastic coupling pieces 710 are locked to the locking groove 310.

During a process of installing the retainer 700 on the first rod 300, the plurality of elastic coupling pieces 710 provided on the retainer 700 are elastically deformed to move away from each other. When the installation of the retainer 700 is completed, the plurality of elastic coupling pieces 710 are elastically restored to be close to each other and then locked to the locking groove 310 of the first rod 300.

It is preferable that the retainer 700 be formed of metal because the retainer 700 is coupled to the first rod 300 and is a part to which a load is applied. It is preferable that the first stopper 500 be formed of resin to prevent noise from being generated by friction with the retainer 700.

Furthermore, since the retainer 700 has a size corresponding to the inner diameter of the first stopper 500, the first rod 300 that guides the reciprocating movement of the primary piston 200 may be prevented from wobbling when the primary piston 200 reciprocates, whereby a buckling phenomenon of the first rod 300 may be prevented, and noise may be prevented from being generated.

As described above, in accordance with the present invention, noise generation may be prevented by changing the materials and shapes of parts. Furthermore, the number of various parts may be reduced by improvement in structure, whereby the weight of a product may be reduced, and the production cost may be reduced.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A cylinder apparatus for a brake comprising:
   a piston configured to reciprocate in a cylinder body;
   a rod coaxially coupled to the piston;
   a stopper disposed in the cylinder body, with the rod penetrated and inserted into the stopper; and
   an elastic member disposed between the piston and the stopper and configured to elastically support the piston in a direction away from the stopper, wherein:
the piston and the rod are integrally formed by injection molding; and
the stopper is formed of resin.

2. The cylinder apparatus of claim 1, wherein the rod comprises:
a rod body coupled at one end thereof to the piston; and
a rod head coupled to the other end of the rod body and configured to pass through a through hole formed in the stopper.

3. The cylinder apparatus of claim 1, wherein the piston is formed of resin.

4. A cylinder apparatus for a brake comprising:
a piston configured to reciprocate in a cylinder body;
a rod coaxially coupled to the piston;
a stopper disposed in the cylinder body, with the rod penetrated and inserted into the stopper; and
an elastic member disposed between the piston and the stopper and configured to elastically support the piston in a direction away from the stopper,
wherein:
the piston and the rod are integrally formed by infection molding;
the rod comprises:
a rod body coupled at one end thereof to the piston; and
a rod head coupled to the other end of the rod body and configured to pass through a through-hole formed in the stopper; and
the rod head has a hemispherical shape on a stopper-side end thereof.

5. The cylinder apparatus of claim 4, wherein an outer diameter of the rod head is greater than an inner diameter of the through hole.

6. A cylinder apparatus for a brake comprising:
a floating piston configured to reciprocate in a cylinder body;
a primary piston configured to reciprocate in the cylinder body in conjunction with the floating piston;
a first rod coaxially provided with the primary piston and coupled to one side of the primary piston, the first rod being disposed to protrude toward the floating piston;
a compressing block coaxially provided with the primary piston and coupled to the other side of the primary piston so that the compressing block is compressed by a push rod of a booster;
a first stopper coupled to the floating piston, with the first rod penetrated and inserted into the first stopper; and
an elastic member disposed between the primary piston and the first stopper and configured to elastically support the primary piston in a direction away from the first stopper,
wherein the primary piston is formed of resin, and the first rod and the compressing block are formed of metal.

7. The cylinder apparatus of claim 6, wherein the first rod and the compressing block are integrally formed.

8. The cylinder apparatus of claim 7, wherein the primary piston is integrally formed with the first rod and the compressing block through an insert injection molding process.

9. The cylinder apparatus of claim 6, wherein a retainer having a size corresponding to an inner diameter of the first stopper is installed on an end of the first rod.

10. The cylinder apparatus of claim 9, wherein the retainer is provided with an elastic coupling piece bent in a direction in which the first rod is coupled to the retainer, and the first rod has in the end thereof a locking groove to which the elastic coupling piece is locked.

* * * * *